(12) United States Patent
Bellay

(10) Patent No.: US 10,753,649 B2
(45) Date of Patent: Aug. 25, 2020

(54) ROOF PANELS TO SERVE AS THERMAL COLLECTORS

(71) Applicant: Péter Bellay, Budapest (HU)

(72) Inventor: Péter Bellay, Budapest (HU)

( * ) Notice: Subject to any disclaimer, the term of this patent is extended or adjusted under 35 U.S.C. 154(b) by 160 days.

(21) Appl. No.: 15/759,189

(22) PCT Filed: Apr. 20, 2017

(86) PCT No.: PCT/HU2017/000027
§ 371 (c)(1),
(2) Date: Mar. 9, 2018

(87) PCT Pub. No.: WO2017/182832
PCT Pub. Date: Oct. 26, 2017

(65) Prior Publication Data
US 2018/0252439 A1    Sep. 6, 2018

(30) Foreign Application Priority Data

Apr. 20, 2016  (HU) .................................. 1600265

(51) Int. Cl.
*F24S 20/67* (2018.01)
*E04D 3/35* (2006.01)
(Continued)

(52) U.S. Cl.
CPC .............. *F24S 20/67* (2018.05); *E04C 2/292* (2013.01); *E04C 2/525* (2013.01); *E04D 3/351* (2013.01);
(Continued)

(58) Field of Classification Search
CPC ......... E04C 2/525; E04C 2/292; E04D 3/351; E04D 3/352; E04D 3/354; E04D 3/357;
(Continued)

(56) References Cited

U.S. PATENT DOCUMENTS

| 4,135,490 A | 1/1979 | Soleau, Jr. |
| 4,237,866 A | 12/1980 | Rush |
| 4,284,066 A | 8/1981 | Brow |
| 4,437,456 A * | 3/1984 | Merrigan ................ F24S 10/30 126/637 |

(Continued)

FOREIGN PATENT DOCUMENTS

| DE | 10258711 | 7/2003 |
| EA | 201170630 A1 | 10/2011 |

(Continued)

OTHER PUBLICATIONS

Office Action dated Sep. 17, 2019, in Eurasian Patent Application No. 201891746/31.

*Primary Examiner* — Grant Moubry
*Assistant Examiner* — John E Bargero

(57) ABSTRACT

Systems and methods for collecting solar energy and ambient heat are provided. A roof panel includes a metal sheet disposed about an upper end of the roof panel. Heat insulation is disposed below the metal sheet. At least one hot air duct and at least one cold air duct are each formed parallel to a rafter direction and in the plane of the roof panel. Each hot air duct is exposed to a surface of the metal sheet, and each cold air duct is encompassed by the heat insulation. A medium collectively fills the air ducts. A lower air reversing chamber is formed at a lower end portion of the roof panel, and an upper air reversing chamber is formed at an upper end portion of the roof panel. A cooling device is disposed in the upper air reversing chamber.

10 Claims, 5 Drawing Sheets

Figure 1:
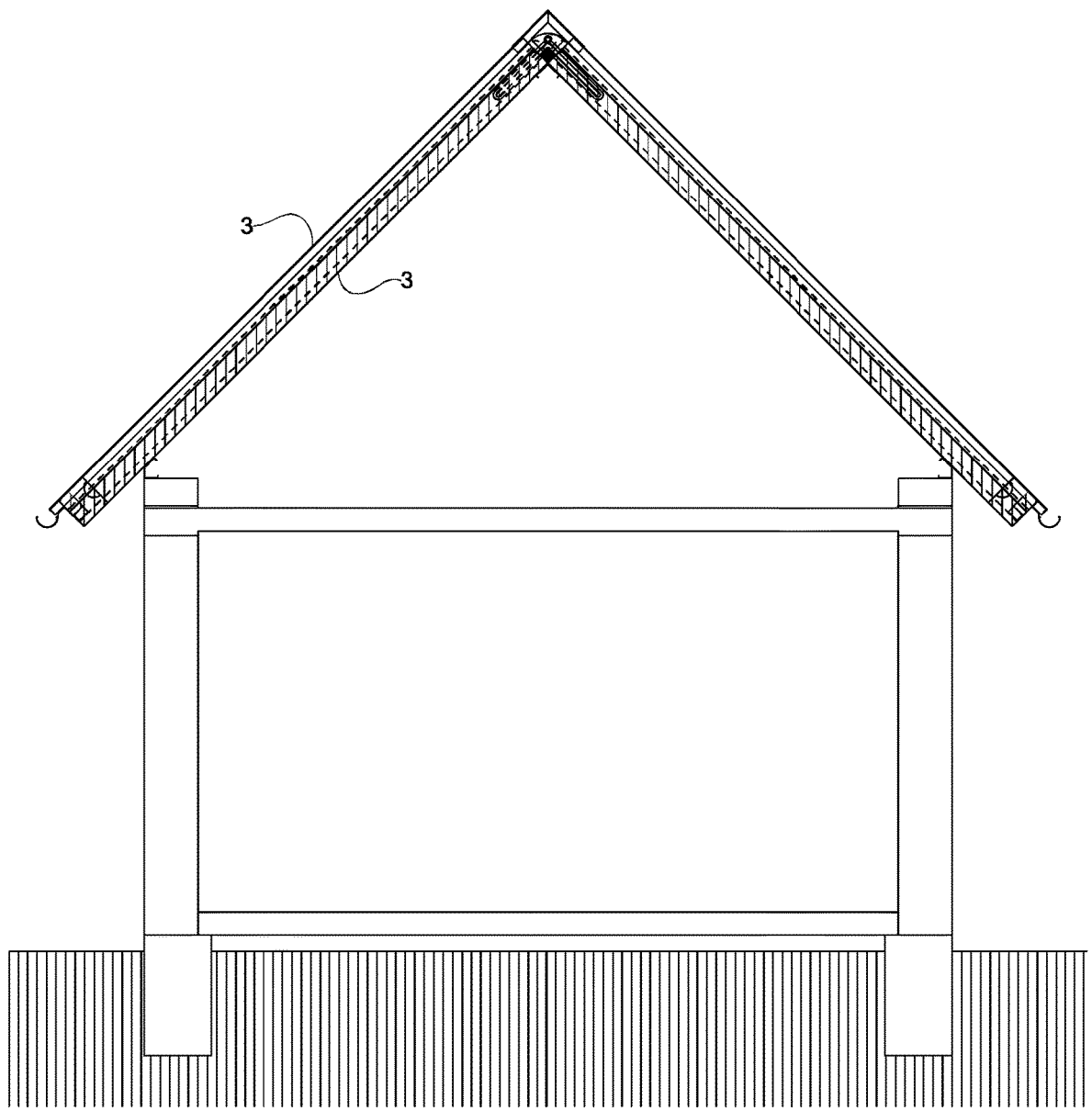

(51) Int. Cl.
*E04D 13/17* (2006.01)
*F24F 7/02* (2006.01)
*E04C 2/292* (2006.01)
*E04C 2/52* (2006.01)
*F24S 80/60* (2018.01)
*E04B 7/22* (2006.01)
*F24S 10/50* (2018.01)
*F24S 10/70* (2018.01)

(52) U.S. Cl.
CPC ............ *E04D 3/352* (2013.01); *E04D 3/354* (2013.01); *E04D 3/357* (2013.01); *E04D 13/17* (2013.01); *E04D 13/172* (2013.01); *F24F 7/02* (2013.01); *E04B 7/22* (2013.01); *F24S 10/504* (2018.05); *F24S 10/72* (2018.05); *F24S 80/60* (2018.05); *Y02B 10/20* (2013.01); *Y02E 10/44* (2013.01)

(58) Field of Classification Search
CPC .......... E04D 13/17; E04D 13/172; F24F 7/02; F24S 20/67; F24S 10/72; F24S 80/60; F24S 10/504; Y02B 10/20; E04B 7/22; Y02E 10/44
USPC ........................................................ 126/621
See application file for complete search history.

(56) References Cited

U.S. PATENT DOCUMENTS

| | | |
|---|---|---|
| 8,753,732 B2 | 6/2014 | Jorgensen |
| 2005/0081908 A1 | 4/2005 | Stewart |
| 2019/0055731 A1* | 2/2019 | Nasibov .................. E04O 2/292 |

FOREIGN PATENT DOCUMENTS

| | | |
|---|---|---|
| EP | 0025305 | 3/1981 |
| EP | 2015000 | 1/2009 |

* cited by examiner

ROOF PANELS TO SERVE AS THERMAL COLLECTORS

The subject of the invention is an arrangement of roof panels already used in buildings in a way that makes them capable of obtaining solar radiation and ambient heat energy and transferring the energy out of the roof. The subject of the invention is also the method for the use of the arrangement.

Since the supply of fossil fuels is finite, it is appropriate to include solar energy as a source for the energy supply of houses and other buildings. Several solutions aiming to do this have already been worked out, such as, for example, in the form of an auxiliary equipment that can be installed onto the roof of the building, or an equipment utilizing energy resources formed and arranged beside the building.

Utilization of the renewable energy powered by the sun can also be performed in the direct physical vicinity of the buildings, e.g.: solar collectors, solar panels, heat pumps laid down or drilled into the ground surrounding houses, or two-directional atmospheric heat pumps, etc. Energy consumption can be reduced by improving the heat insulation of buildings (passive house), or by using a system that utilizes energy gained from the environment on site, periodically recuperating some of said energy to the grid (active house).

Products of roof panel manufacturers like Kingspan in Ireland, Lindab in Sweden, Metalsheet in Hungary, fit into the "passive house" line. Usually their products come with a wide selection of heat insulation values.

The document U.S. Pat. No. 4,237,866 discloses a solar heater with a plurality of liquid passages. The liquid is heated only by radiating solar energy, through a plurality of transparent covering plates made of glass. Due to the multiple layers the solar radiation has to pass through, the efficiency of the solar heater is low. Furthermore, the heater is not an inherent part of the roofing.

There are also several manufacturers serving the "active house" market. Solar collectors as one of the many solutions for harvesting energy on site near the building shall be mentioned.

Solar collectors can be grouped based on two main principles of operation.

a) According to a generally used solution a liquid is circulated in a tubing embedded in various heat absorbing materials, arranged in various frames subsequently installed on a roof, said liquid, when heated carries the heat from the panel to other units utilizing the heat. A known manufacturer: Vaillant in Germany (EP2015000 A2 [2009 Jan. 14.] "Frame with solar absorbent tube and reception means"; DE10258711 A1 [2002 Dec. 12.] "Solar collector unit has several tubular collectors fixed on main collector body which is formed by extruded cast profiled section"). According to the solution disclosed in the U.S. Pat. No. 4,135,190, entitled "Recirculating natural convection solar energy collector" a heat exchanger is formed comprising spaces separated by plates in a frame covered by a transparent plate on the front side and non-transparent plates on the other sides, A liquid circulation is generated in the so formed heat exchanger and the absorbed heat can be continuously transferred and used. This device has the same disadvantages namely that the multiple plates lower the efficiency, A similar solution is proposed in the U.S. Pat. No. 3,987,782, entitled "Solar heat holder". Both patent documents comprise the description and training for separately applied heat exchanger units that can be installed on the roofs of residential buildings.

The document U.S. Pat. No. 4,284,066 also discloses a "Solar liquid heater", comprising several layers of heat absorbing and covering plates that reduce the efficiency of the device. The top layer is glass or plastic. This device is also designed to be built on top of the roof instead of being integral part of the roof and the holding structure.

b) Evacuated tube solar collectors show a more efficient solution: a vacuum is generated between two glass tubes, one inserted into the other and sealed at the end. The vacuum between the two tubes provides heat insulating function. The internal closed tube contains a liquid that evaporates when the sun shines on it, then it delivers heat when condensing at the cold end of the tube. Heat transfer is allowed by the energy of change of the state of condition of the substance. This system is also mounted in a panel. In addition to its many advantages only the radiated energy from the sun is utilized, ambient heat cannot be utilized due to the insulating property of the vacuum. A similar solution is disclosed in EP 0 025 305 A1 [1981 Mar. 18.], entitled "Absorber for electromagnetic energy".

Solar panels that convert solar energy directly into electric energy shall be mentioned as well, widely used based on the application methods of semiconductors developed in the 20th century. Among others, US 2005081908 A1 [2005 Apr. 21.], entitled "Method and apparatus for generation of electrical power from solar energy" discloses such a solution.

The disadvantage of the above solutions is that they only utilize a small portion of the building's usable surface for gaining energy. Furthermore, it is also disadvantageous that they use primarily the radiated energy of the sun while the ambient energy is not used, or used to a very small extent.

A further disadvantage of the above solutions is that they do not constitute a part of the building, they are made up of units that can be mounted onto an existing building, and of other equipment that can be attached to them. Their use does not allow for reducing the cost of construction.

In order to eliminate the disadvantages mentioned above a new solution is proposed based on the recognition that a roof structure of a building can be designed so that most of the roof surface of the entire roof surface consists of heat exchange roof panels, to be described in detail below, functioning as heat collectors and capable of meeting all structural requirements set for the elements, and at the same time can absorb and utilize ambient heat in addition to radiate heat. Furthermore, there is no need for using any transparent external cover plate; by the use of a profile metal sheet cover plate serving as a heat absorber or of heat conducting ribbed metal form, ambient heat can also be utilized.

The present invention is a structural element comprising a heat insulating material arranged between sheets with load-bearing capacity, similar to the known load-bearing sandwich panels. Whether the sheet profiles are placed in the direction of the ridge beam or of the rafters, with appropriate assembling of them hollow structures are formed on the surface and in the core of the panel in the direction of the rafters, along the entire rafter length of the roof, functioning as pathways for aeriform material in air ducts, If these air ducts, both external and in the core, and connected at the end facing each other, the substance in them will start to flow on its own using solely gravitational forces in reaction to heat reaching the panel's external surface. If at a given point on the panel the substance is cooled, the spontaneous flow will remain continuous. Through cooling the heat collected in the air ducts is transported out of the system, and this heat could be further utilized to provide energy for our needs.

The subject of the application is therefore a roof panel which functions as a thermal collector, forming physically the roof structure of a building and forming an integral part of the roof structure meeting without fail all protection requirements set for roof constructions, respectively, Due to its special design it is capable of absorbing ambient heat too and transferring this heat to a heat storage by the use of a compatible, knowing auxiliary appliance.

Radiated energy was already used by the cave man, when he turned his back towards the sun, while the principle of recirculating heat exchanged has been used by humanity for some hundred years. Compared to other known solar panel patents, the essence of my invention is complete different and new spatial arrangement, in which a roof compared to traditional roof structures of buildings is capable of collecting as well as transmitting radiated and ambient energy by the aid of a new roof panel arrangement.

The loft or the building itself is covered by the newly developed roof panels, fitted and assembled together along their sides; the panels are forming the rood, i.e., are a structural part of the building Heat absorption on a large surface, and the use of a heat pump, provides a significant amount of heat energy even in cloudy weather, even at moderate temperature differences.

The invention will be described more detailed below.

DISCLOSURE OF THE FIGURES

Figure 2:
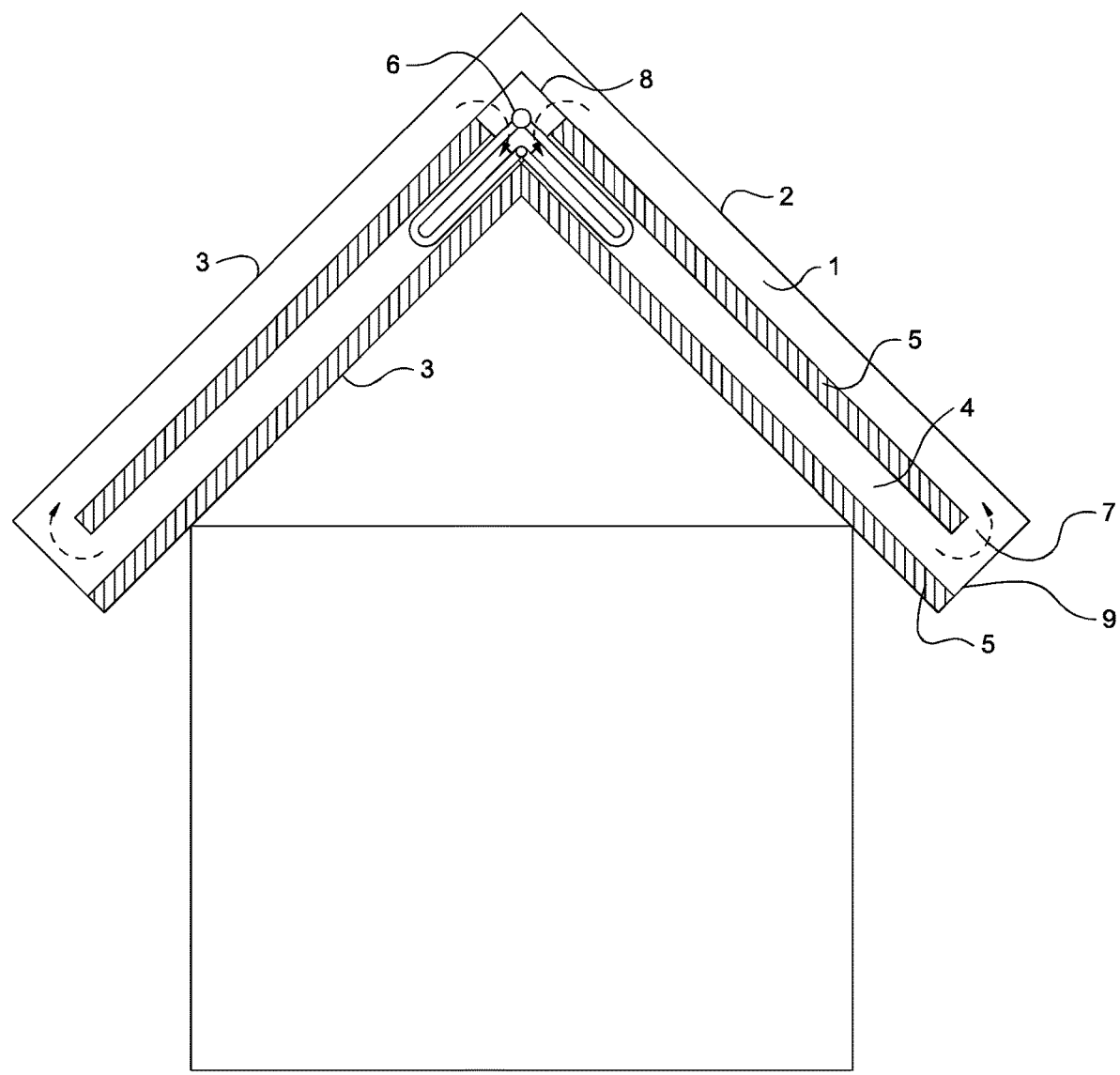
Figure 3:
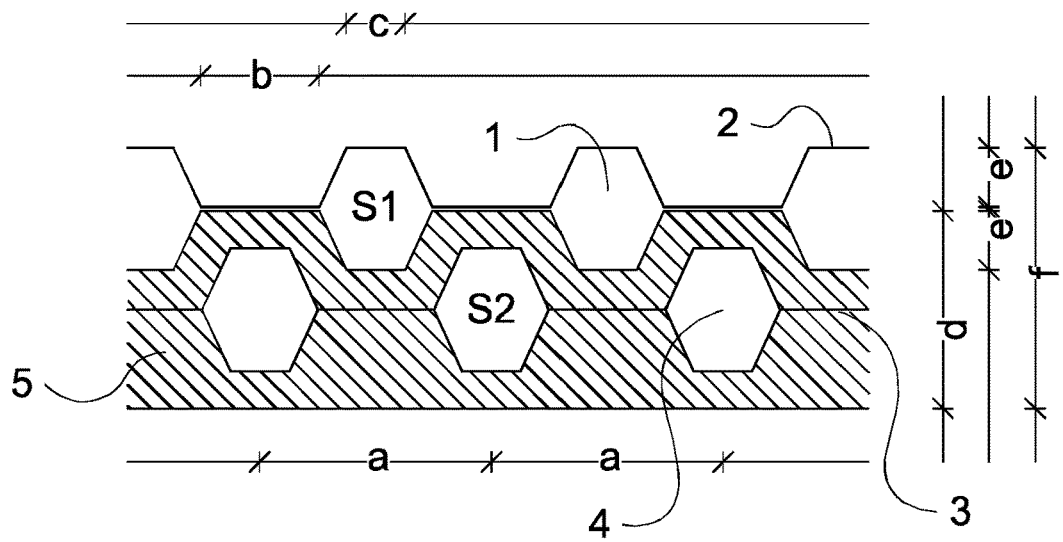
Figure 4:
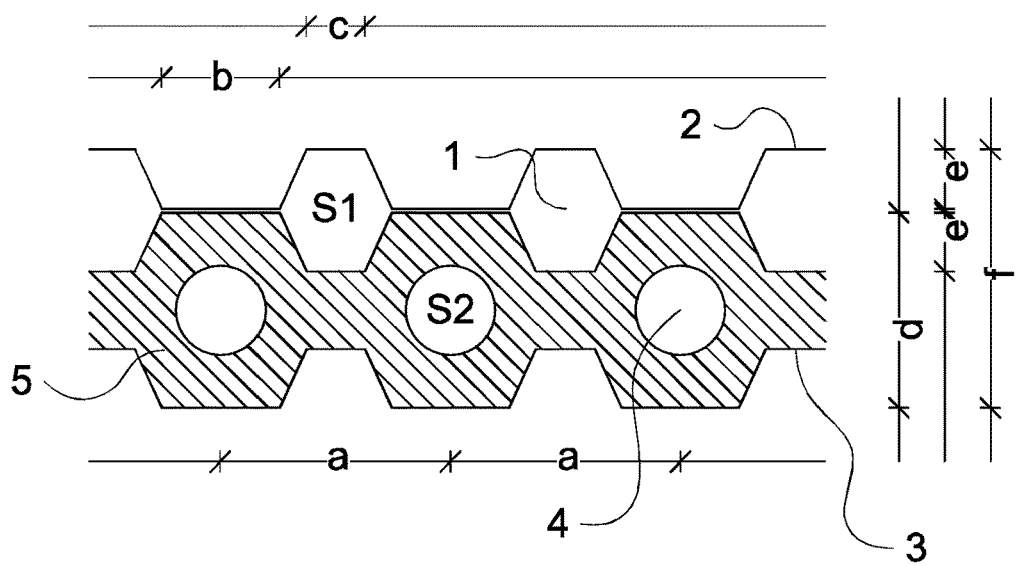
Figure 5:
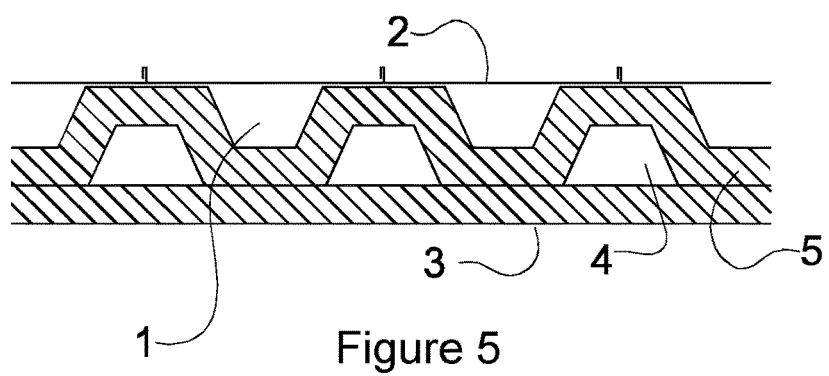
Figure 6:
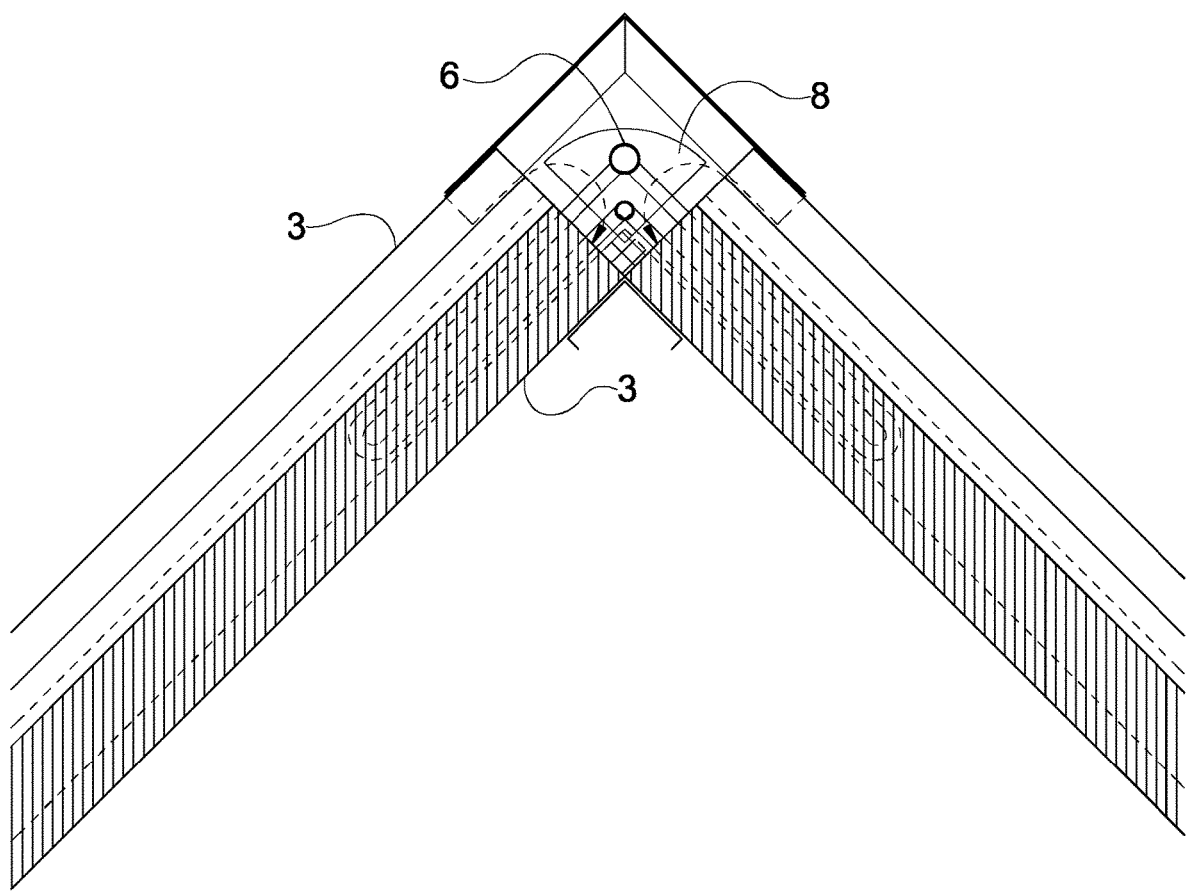
Figure 7:
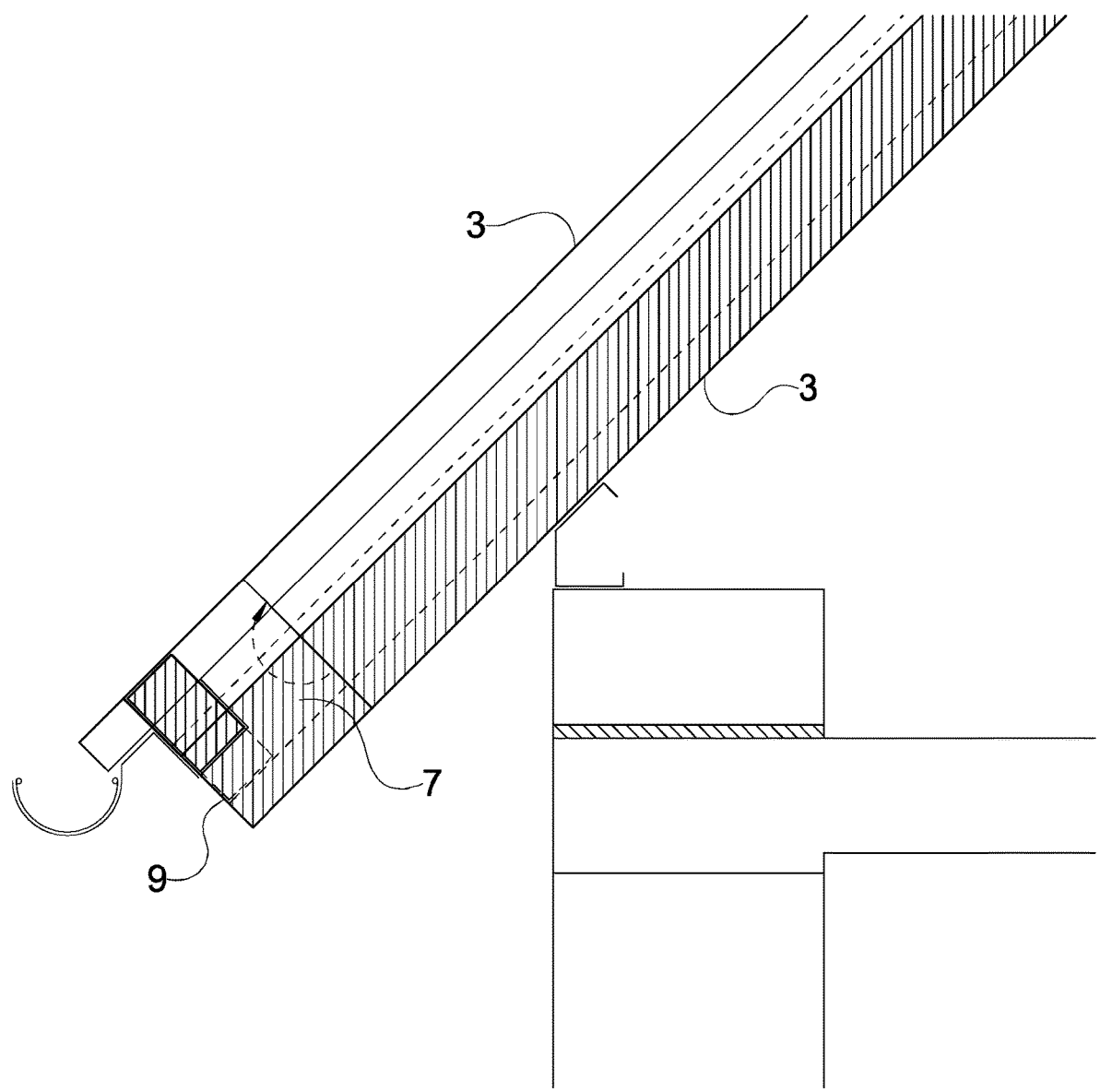

List of reference signs on the drawings:
1—hot air duct
2—metal sheet
3—roof panel
4—cold air duct
5—heat insulation
6—cooling device
7—lower air reversing chamber
8—upper air reversing chamber
9—condensate drain hole
a—distance between cold air ducts
b, c, e-dimensions of trapezoid sheet
d—thickness of heat insulated panel
f—total thickness of the panel structure
S1—cross-section of the hot air duct
S2—cross-section of cold air duct
FIG. 1 shows the arrangement of the roof panel 3 making up the roof structure of a building.
FIG. 2 shows the operating principle of the roof panel 3 constituting the roof structure of a building.
FIGS. 3, 4, and 5 show three different roof panel cross-sections representing advantageous implementations of the invention. Matter-of-course, by the use of the invention further sheet profiles can be formed.
FIG. 6 shows the upper air reversing chamber 8 and its location, partly concealed by the internal heat exchanger and represented by a dotted line in favorable saddle roof arrangements.
FIG. 7 shows the lower air reversing chamber 7 and its location.

SHORT GENERAL DESCRIPTION

In the plane of the roof panel 3, there are two rows of ducts arranged, preferably a row of hot air ducts 1 and cold air ducts 4, running parallel in rafters' direction. The outer side of the row of the hot air ducts 1 is covered with an external profiled metal sheet 2 having an external surface made of known structural materials capable of absorbing solar radiation and ambient heat, preferable corrugated metal sheet, even more advantageous trapezoid profiled metal sheet or aluminum foam shape. Between the rows of hot air ducts 1 and bold air ducts 4, and on the inner side of the roof panel 3 heat insulation 5 is arranged (FIGS. 3, 4 and 5). The heat insulation 5 can be formed from one piece (FIG. 4) or separate pieces that are connected together (FIGS. 3 and 5) forming a sandwich like structure. At the lower and upper ends of the roof panel 3, there are air reversing chambers 7, 8 (FIGS. 6 and 7), located at the ridge and purling offering a combined connection of hot air ducts 1 and cold air ducts 4, as both the lower air reversing chamber 7 and upper air reversing chamber 8 is extended along the ridge and the purling, respectively.

In the upper air reversing chamber 8 of the roof panel 3 a cooling device 6 is arranged comprising a streaming cooling medium for discharging heat from the system, where the U-shaped fingers of the cooling device 6 are located in the upper end of the cold air ducts 4 (FIGS. 2 and 6).

DETAILED DESCRIPTION OF THE FUNCTION OF THE INVENTION

The outer side of the hot air duct 1 serves to absorb solar radiation and ambient heat via the external profiled metal sheet 2. The rows of cold air ducts 4 are located inside the roof panel 3, thus separated by the heat insulation 5 from the interior of the building. The hot air ducts and the cold air ducts 4 are preferably running through the roof panel 3 and rafters' direction, from the bottom of the plane of roof to the ridge.

At the lower and upper ends of the roof panel 3, lower are upper air reversing chambers 7, 8 are formed, which make possible the circulation of the medium inside of the roof panel 3. The circulation of the medium in the hot air ducts 1 and cold air ducts 4 preferably occurs by gravity or by forced-circulation in case of necessity.

The cooling device 6 is located in the upper air reversing chamber 8 (hot point), which serves the purpose of extracting heat, with a known widely used cooling medium circulating in it, and where preferable, the cold side of a heat pump can be connected into.

The medium, which has been heated up, rises in the hot air duct 1 while the medium, which has cooled down descends in the cold air duct 4.

The roof panel 3 can be formed using various structural materials such as metals, profiled sheets and thermal insulating materials, suitable for heat insulated delimitation of the outer and inner space of the building, forming a self-supporting roof panel structure and with proper dimensioning, also functioning as roof elements supported either by purlins or rafters in accordance with the requirements of statics. Thus installing of further raters or purlins in the roof structure is not necessary.

The external limiting profiled metal sheet 2 is preferably a metal sheet of proper heat conductivity, warming up at incident radiation and transmitting the external heat to the neighboring air ducts, furthermore, it is formed as a sectional and/or ribbed profile sheet to withstand against thermal dilation and to increase rigidity. As a matter of course, use of profiled sheet increases the heat transferring surface too and radiation non-perpendicular to the plane of the roof can be better utilized with higher efficiency.

Inter-connecting the constituents of the roof panel 3, like external, internal, covers sheets and hot and cold air ducts 1, 4 by mechanical, non-heat-conductive materials like plastic screws or shaped elements, the structural strength of the roof panel 3 is significantly increased, making possible forming a panel structure for optimizing the sheet thickness and enabling larger spans.

In the following two examples for dimensioning of the heat collector sandwich panel 3 according to the invention will be shown. The invention is not restricted by the examples to the given shapes, measures, dimensions and can be re-dimensioned using simple calculations and experimentations in accordance with given requirements, taking the characteristics of the used materials into consideration.

Example 1 (FIG. 3); Both the Hot and Cold Air Ducts 1, 4 have Hexagonal Cross-Sections

| | | |
|---|---|---|
| Distance between cold air ducts | a | 23.5 cm |
| Dimensions of the trapezoid sheet | b | 12 cm |
| | c | 6 cm |
| | e | 6 cm |
| Thickness of heat insulated panel | d | 21 cm |
| Total thickness of the panel structure | f | 27 cm |
| Cross-section of the hot air duct | S1 | 105 cm$^2$ |
| Cross-section of cold air duct | S2 | 205 cm$^2$ |

Example 2 (FIG. 4): The Hot Air Duct Consists of Ducts of Hexagonal Cross-Section, the Cold Air Duct 4 Consists of Ducts of Circular Cross-Section

| | | |
|---|---|---|
| Distance between cold air ducts | a | 23.5 cm |
| Dimensions of the trapezoid sheet | b | 12 cm |
| | c | 6 cm |
| | e | 6 cm |
| Thickness of heat insulated panel | d | 20 cm |
| Total thickness of the panel structure | f | 26 cm |
| Cross-section of the hot air duct | S1 | 105 cm$^2$ |
| Cross-section of cold air duct | S2 | 53 cm$^2$ |

The heat transfer medium in the hot and cold air ducts 1, 4 is preferably under atmospheric pressure or different once, circulating by gravity or by force. The circulating heat transfer medium can be chosen from different substances. Preferably it should be a gaseous substance, even more preferably atmospheric air is to be used.

Small holes are drilled on the bottom of the lower air reversing chamber 7, creating the condensate drain hole 9, to allow condense free to drain from the system.

The operation of the invention, using air as heat transfer medium: The medium in the hot air duct 1 takes over the temperature of the external limiting profiled metal sheet 2, preferably ribbed metal sheet. As a result of the heat, the medium expands and its density decreases. The heavier medium in the cold air duct 4 makes an effort to take the place of the hot medium through the lower air reversing chamber 7 and pushes the hot medium up to the upper air reversing chamber 8 of the roof panel 3.

In the upper air reversing chamber 8, the hot air passes its heat to the cooling device 6 and while cooling down its volume decreases. Since its density increases it sinks to the cold air duct 4. The continuous heating and cooling results in a self-circulation of the medium in the hot and cold air ducts 1, 4. The heat thus taken over by the liquid in the cooling device 6 can be used for further known utilizations, preferably at additional storage in a hot water tank, using other technologies for supplying hot water to the household, heating the building, or even to generate electric energy.

It is also possible to use the roof panel 3 for heating of water or other known heat storing substances.

Once the utilization within the building does not require further heat absorption, ventilation windows located at the end of the lower and upper air reversing chambers 7, 8 will be opening in a controlled way, resulting in a free flow out of the warm medium, air, from the panel through the upper window. In this way the air flow conveys the heat from the panel into the environment and the increase of the thermal loading of the building can be avoided.

Of course the roof panel 3 can be used in roofs with different slopes. As it is well-known, slope and orientation of the roof have a great influence on the maximum possible yield.

The invention claimed is:

1. An arrangement of roof panels of a roof of a building, wherein the arrangement of roof panels utilize radiated solar energy and ambient heat, the arrangement comprising:
    a roof panel comprising:
        a metal sheet configured to absorb solar radiation and ambient heat and disposed about an upper end portion of the roof panel, wherein the metal sheet comprises an external surface and an internal surface;
        heat insulation disposed below the metal sheet,
        at least one hot air duct, wherein each hot air duct in the at least one hot air duct is formed parallel to a rafter direction of the roof and in the plane of the roof panel and comprises:
            an upper end portion exposed to the internal surface of the metal sheet, and
            a lower end portion exposed to a portion of the heat insulation;
        at least one cold air duct, wherein each cold air duct in the at least one cold air duct is formed parallel to the rafter direction of the roof and in the plane of the roof panel and encompassed by the heat insulation;
        a gaseous medium collectively filling the at least one hot air duct and the at least one cold air duct;
        a lower air reversing chamber formed at a lower end portion of the roof panel, and
        an upper air reversing chamber formed at an upper end portion of the roof panel; and
    a cooling device disposed in the upper air reversing chamber, the cooling device comprising a streaming cooling medium for discharging heat.

2. The arrangement according to claim 1, wherein a hole is disposed at a lower end portion of the lower air reversing chamber.

3. The arrangement according to claim 1, wherein:
    the heat insulation comprises an upper heat insulation and a lower heat insulation, and
    the at least one cold air duct is disposed interposing between the upper and lower heat insulations.

4. The arrangement according to claim 1, characterized in that the material of the heat insulation (5) is known heat insulation composite and/or masonry material.

5. A method for collecting heat in through circulation with the use of the arrangement according to claim 1, comprising:
    heating the metal sheet with solar energy and/or ambient heat;
    exchanging the heat from the metal sheet to the gaseous medium in the at least one hot air duct, thereby forming a low density portion of the gaseous medium drawn into the upper air reversing chamber;

exchanging the heat from the lower density portion of the gaseous medium to the streaming cooling medium of the cooling device, thereby heating the streaming cooling medium and forming a high density portion of the gaseous medium drawn into the lower air reversing chamber, thereby circulating the gaseous medium.

6. The method according to claim 5, further comprising using the heated streaming cooling medium of the cooling device for heating a water tank, storing heat, supplying hot water to the building, heating the building, or generating electric energy.

7. The method according to claim 5, further comprising installing the roof panels lengthwise into the roof parallel either with the rafter or purlin, wherein each of the at least one hot air duct and the at least one cold air duct extend from the lower air reversing chamber towards the upper air reversing chamber parallel to the rafter direction of the roof.

8. The method according to claim 5, further comprising disposing the roof panel at roof planes with different slopes being less than 90 degrees.

9. The method according to claim 5, further comprising using the roof panel as the roof of the building, as an integral portion of the roof, or a combination thereof.

10. The method according to claim 5, further comprising using the gaseous medium for transferring heat in the at least one hot air duct (1) and in the at least one cold air duct, wherein the gaseous medium is air at atmospheric pressure.

\* \* \* \* \*